N. R. JESUP.
COMMERCIAL CERTIFICATE.
APPLICATION FILED DEC. 2, 1915.
1,311,698.
Patented July 29, 1919.
2 SHEETS—SHEET 1.
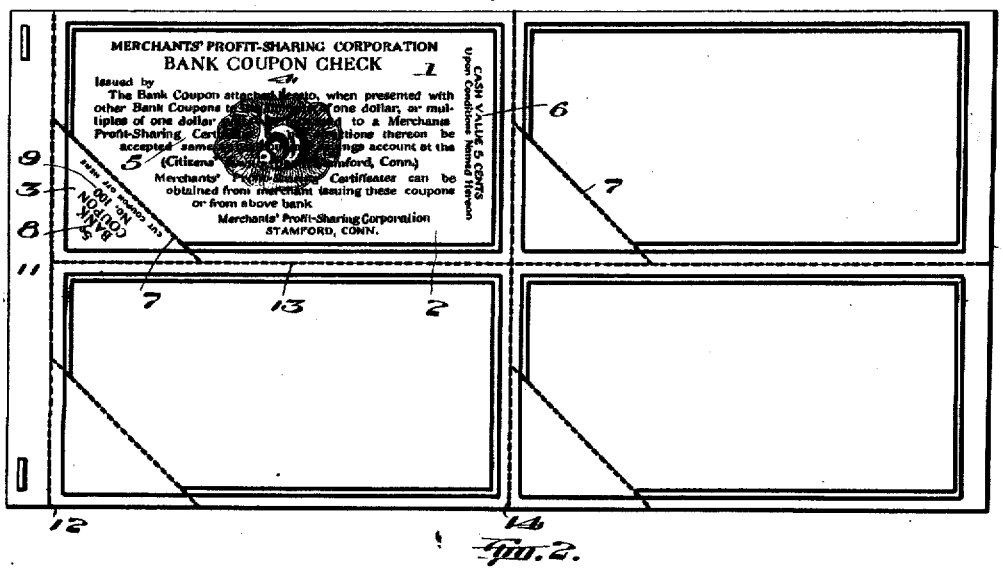
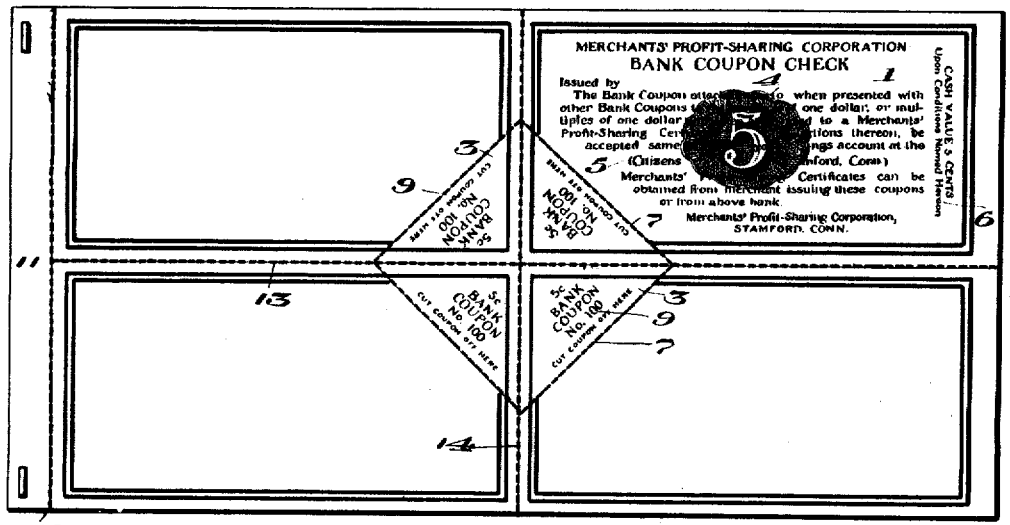
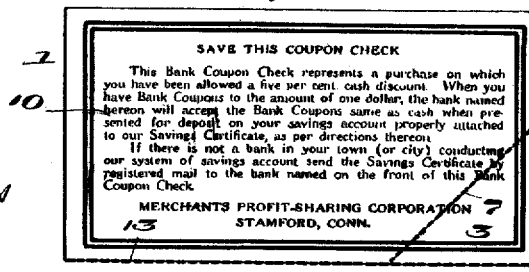
Witnesses
Philip E. Barnes
James Atkins
Inventor
Nelson R. Jesup
Attorney

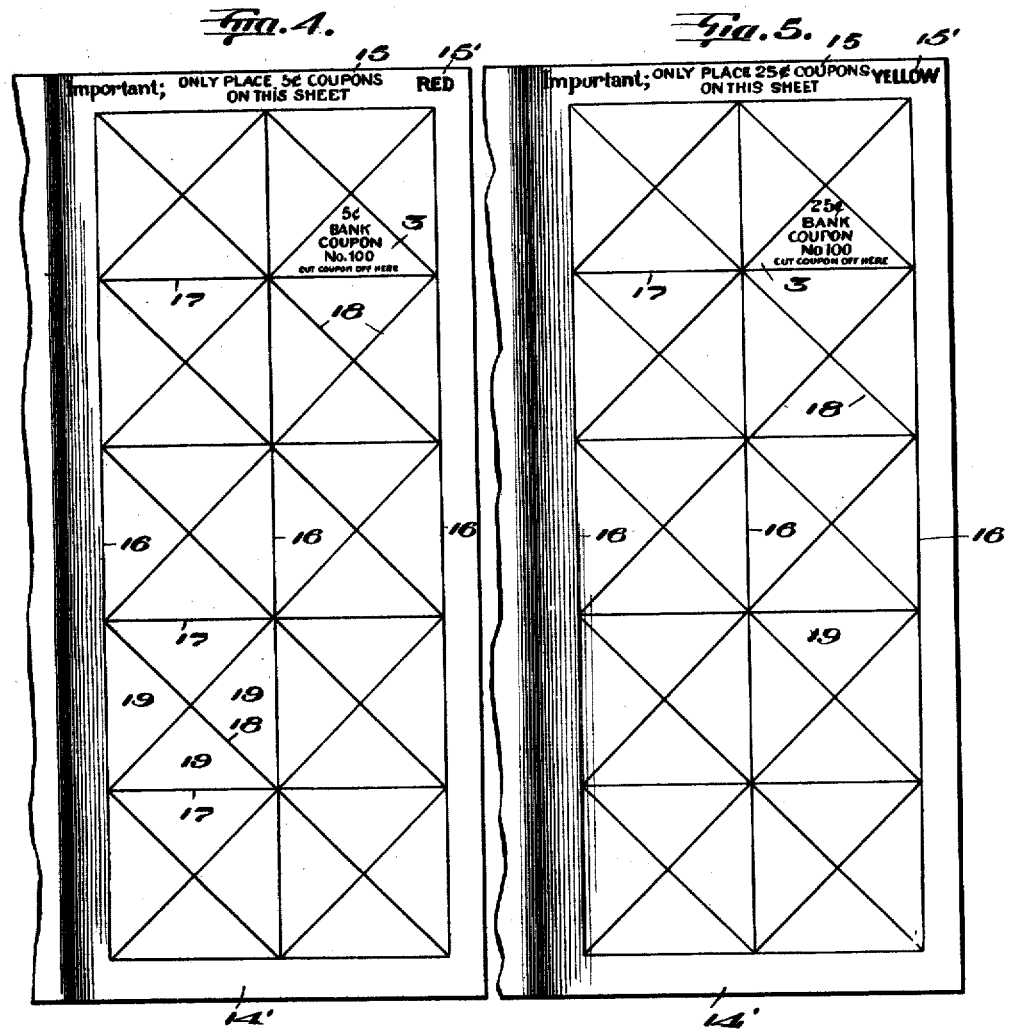

UNITED STATES PATENT OFFICE.

NELSON R. JESUP, OF STAMFORD, CONNECTICUT, ASSIGNOR TO MERCHANTS PROFIT SHARING CORPORATION, OF NEW YORK, N. Y., A CORPORATION OF NEW YORK.

COMMERCIAL CERTIFICATE.

1,311,698.      Specification of Letters Patent.      Patented July 29, 1919.

Application filed December 2, 1915. Serial No. 64,686.

*To all whom it may concern:*

Be it known that I, NELSON R. JESUP, a citizen of the United States, residing at Stamford, in the county of Fairfield and State of Connecticut, have invented certain new and useful Improvements in Commercial Certificates, of which the following is a specification, reference being had therein to the accompanying drawing.

This invention relates to commercial certificates.

It comprises a profit sharing coupon or element (which represents a predetermined discount—such as a cash discount—on a sale or other transaction, as distinguished from a premium certificate in the ordinary acceptance of the term) and an associable sheet or element adapted to carry portions of the coupon and become a bankable instrumentality.

Its primary object is the production of an associable coupon and a bankable instrumentality which will each be of simple form and use of which will be easily understood by users, and without necessitating the employment of an elaborate or complicated system of accounting by distributers and tend to stimulate cash buying and to increase bank savings accounts.

The coupons, comprising a component including a check and a deposit certificate unit, are issued from a central organization, such as a bank, to merchants, who in turn present them to purchasers in denominations representing the rate and amount of a discount on a given transaction. The bank coupon or deposit slip is detached from the check component and placed in a coupon book representing fractional portions of a deposit slip, and when the amount of such fractional portions assumes a predetermined total, the sheet or slip thus formed becomes a deposit or savings certificate accepted by the bank as a cash deposit.

Other objects and advantages attained by the invention will be brought out more clearly in the description which follows:

Drawings illustrating an embodiment of the invention, which will serve to illustrate its practical application, are hereto appended, the following views being shown:

Figure 1 is a plan view showing an aggroupment of the coupons or certificates in book form, together with a front view of one of the coupons.

Fig. 2 is a similar view showing another form of arrangement.

Fig. 3 is a back view of coupon shown in Fig. 1.

Figs. 4 and 5 are detailed views of deposit slips used in conjunction with coupons.

Referring specifically to the drawings, the numeral 1 designates generally a profit sharing coupon embodying one component of my invention. It comprises a body portion or bank coupon check 2, and a detachable portion 3, which represents a bank coupon or fractional portion of the deposit or savings certificate. The body portion bears arbitrarily selected characters designating its value in amounts corresponding to predetermined percentages of discount on sales. These characters are printed, impressed, or otherwise placed thereon in any convenient manner, such identification being in the present embodiment, designated by the numeral 4.

There are also provided on the body portion instructions or directions 5 as to the use of the coupons. In the present instance they are as follows:

MERCHANTS' PROFIT-SHARING CORPORATION BANK COUPON CHECK.

Issued by

The Bank Coupon attached hereto, when presented with other Bank Coupons to the amount of one dollar, or multiples of one dollar, will, when attached to a Merchants' Profit-Sharing Certificate as per directions thereon, be accepted same as cash on your savings account at the (Citizens' Savings Bank, Stamford, Conn.)

Merchants' Profit-Sharing Certificates can be obtained from merchant issuing these coupons or from above bank.

MERCHANTS' PROFIT-SHARING CORPORATION, STAMFORD, CONN.

Similarly, upon another portion of the coupon check there are provided instruction 6 directed to the value thereof as follows: "Cash value 5 cents upon conditions named hereon."

Means for permitting ready detachment of the bank coupon or deposit certificate unit from the body portion, are provided. Such means, in the present instance, are represented as a series of lines of perforations 7 extending diagonally between the two portions. Upon this stub or detachable portion are designations 8 representing the unit value of the coupon, and designations 9 representing a number corresponding to a bank account number. An inscription embodying this information is placed thereon as follows:

"5 cent bank coupon. No. 100. Cut coupon off here."

The detaching of the bank coupon or deposit certificate cancels the bank coupon check.

Upon the opposite face of the certificate there is provided an inscription 10 as follows:

SAVE THIS COUPON CHECK.

This Bank Coupon Check represents a purchase on which you have been allowed a *five* per cent. cash discount. When you have Bank Coupons to the amount of one dollar, the bank named hereon will accept the Bank Coupons same as cash when presented for deposit on your savings account properly attached to our Savings Certificate, as per directions thereon.

If there is not a bank in your town (or city) conducting our system of savings account send the Savings Certificate by registered mail to the bank named on the front of this Bank Coupon Check.

MERCHANTS PROFIT-SHARING CORPORATION, STAMFORD, CONN.

The coupons may be arranged in any convenient manner, in book or pad form. In the arrangement shown in Fig. 1, they are assembled to form the leaves of a book and secured to a stub portion 11 thereon. In the present instance, means are provided to facilitate their ready detachment, such means represented by a line of perforations 12. Similarly, a longitudinal line 13 and a vertical line 14 of these perforations extending between the bank coupon checks, divide the page into readily detachable coupons.

Another form of arrangement of the coupons is shown in Fig. 2, wherein the bank coupons, or stub portions of the bank coupon checks are aggrouped in the center of the page in such a manner that the oblique lines of perforations 7 between the stub and the body portion of each coupon form a square in the center of each page which is intersected by the lines of perforations 13 and 14.

In conjunction with the profit sharing coupon just described, there is provided, as a component thereof, a deposit or savings certificate, forms of which are illustrated in Figs. 4 and 5. This may be in the form of a book, pad, or other convenient arrangement, a single sheet 14' being here illustrated to describe its principles. These sheets bear upon their surface in some convenient location designations 15 representing the unit of values of bank coupons to be placed thereon, the scheme being to have only coupons of like valuation upon each page. These designations as represented in Fig. 4 are as follows:

"Important. Only place 5¢ coupons on this sheet."

The pages may likewise be identified by further identifications to distinguish the values of the coupons and for this purpose there is provided a further designation 15' in the present instance corresponding to a color and consisting of the word "red" or "yellow", as they may have been selected to represent different money values of the coupons. It is customary to have the coupons printed in colors corresponding with these designations, and coupons of this color only placed upon the sheet which bears such designation.

Each sheet is divided by vertical lines 16 and horizontal lines 17 into squares which are in turn further sub-divided by lines 18 extending diagonally across the squares and intersecting to form triangular spaces 19. These spaces, when so subdivided, are of the approximate size and shape of the bank coupon or detachable portion of the bank coupon check.

Each bank coupon represents a unit of a deposit or savings certificate and when the spaces 19 have been completely filled on a page by bank coupons, the page becomes a certificate of deposit of a predetermined value and is acceptable by a bank or a central distributing agency as a cash deposit for its face value.

The profit sharing coupons are dispensed from a central agency such as a bank, to merchants, who in turn, issue them to their customers in denominations representing discounts on purchases. The customer tears the bank coupon portion from the bank coupon check, thus canceling the latter, and inserts the coupon in one of the spaces 19 on the savings certificate sheet which bears a corresponding value designation. When the spaces on this certificate are filled, it becomes a deposit certificate of the value indicated and may be deposited with the bank as cash.

It will be seen from this description that the present invention produces a profit sharing coupon which is simple, easily understood, and which induces cash purchasing and saving. While it has been described in relation to the embodiment herein shown, it will be understood that I do not wish to limit myself to the precise form of this disclosure, as many changes may be made in construction and arrangement of the parts without departing from the scope of the invention or sacrificing its chief advantages.

What I claim is:

1. A bank coupon savings certificate comprising a bank coupon check, a coupon carried thereby and detachable from the bank coupon check, an element provided with spaces in which the coupons may be aggrouped, said element constituting a bankable certificate of predetermined value when the spaces thereon are filled with coupons and said coupon bearing characters designating a currency value representing a discount or a sale, and said bank coupon check constituting a receipt for a purchase when the coupon is detached therefrom.

2. A bank coupon savings certificate comprising a bank coupon check, a bank coupon carried thereby and forming a detachable angular portion of the check, an element provided with markings constituting spaces to accommodate a predetermined number of the angular coupon portions of the check and constitute a bankable certificate of a predetermined value when the spaces are filled with coupons, said bank coupon having characters designating a currency value representing a discount on a sale, and said bank coupon check constituting a receipt for a purchase when the coupon is detached therefrom.

In testimony whereof I affix my signature in presence of two witnesses.

NELSON R. JESUP.

Witnesses:
ADOLPH V. SACKRISON,
SAMUEL YOUNG.

Copies of this patent may be obtained for five cents each, by addressing the "Commissioner of Patents, Washington, D. C."